United States Patent
Fujii et al.

(10) Patent No.: US 9,777,137 B2
(45) Date of Patent: Oct. 3, 2017

(54) POLYAMIC ACID, POLYIMIDE, POLYAMIC ACID SOLUTION, POLYIMIDE SOLUTION, POLYIMIDE FILMS OBTAINED FROM THESE SOLUTIONS, AND USE OF POLYIMIDE FILMS

(75) Inventors: Mari Fujii, Shiga (JP); Shinji Ozawa, Shiga (JP)

(73) Assignee: KANEKA CORPORATION, Osaka (JP)

( * ) Notice: Subject to any disclaimer, the term of this patent is extended or adjusted under 35 U.S.C. 154(b) by 270 days.

(21) Appl. No.: 14/125,688

(22) PCT Filed: Jun. 12, 2012

(86) PCT No.: PCT/JP2012/065048
§ 371 (c)(1),
(2), (4) Date: Dec. 12, 2013

(87) PCT Pub. No.: WO2012/173126
PCT Pub. Date: Dec. 20, 2012

(65) Prior Publication Data
US 2014/0093715 A1 Apr. 3, 2014

(30) Foreign Application Priority Data
Jun. 13, 2011 (JP) .................................. 2011-131695
Apr. 3, 2012 (JP) .................................. 2012-084691

(51) Int. Cl.
*B32B 27/32* (2006.01)
*C08K 5/20* (2006.01)
*C08G 73/10* (2006.01)
*C08G 69/26* (2006.01)
*C08K 5/1535* (2006.01)
*C09D 179/08* (2006.01)

(52) U.S. Cl.
CPC ................ *C08K 5/20* (2013.01); *C08G 69/26* (2013.01); *C08G 73/105* (2013.01); *C08G 73/1042* (2013.01); *C08G 73/1075* (2013.01); *C08G 73/1078* (2013.01); *C08G 73/1085* (2013.01); *C08K 5/1535* (2013.01); *C09D 179/08* (2013.01); *Y10T 428/31623* (2015.04)

(58) Field of Classification Search
CPC .. C08G 69/26; C08G 73/1042; C08G 73/105; C08G 73/1075; C08G 73/1078; C08G 73/1085; C08K 5/1535; C08K 5/20; C09D 179/08; Y10T 428/31623
See application file for complete search history.

(56) References Cited

U.S. PATENT DOCUMENTS

2004/0260055 A1  12/2004  Gallucci et al.
2005/0042393 A1   2/2005  Lee et al.
2009/0269597 A1  10/2009  Bito et al.

FOREIGN PATENT DOCUMENTS

| CN | 1836007 | | 9/2006 | |
|---|---|---|---|---|
| JP | 2009215412 | | 9/2009 | |
| JP | 2009215412 A | * | 9/2009 | |
| JP | 2009216919 | | 9/2009 | |
| JP | 2010070721 | | 4/2010 | |
| JP | 2010122297 | | 6/2010 | |
| JP | 2010122297 A | * | 6/2010 | |
| JP | 2010180349 | | 8/2010 | |
| JP | 2010189578 | | 9/2010 | |
| JP | WO 2011033690 A1 | * | 3/2011 | ......... C08G 73/1042 |
| WO | 2008/010494 | | 1/2008 | |
| WO | 2011/033690 | | 3/2011 | |

OTHER PUBLICATIONS

JP 2009-215412 A Machine Translation.*
WO 2011-033690 A1 Machine Translation.*
JP 2010-122297 A machine translation provided by Applicant.*
International Search Report, International Application No. PCT/JP2012/065048, dated Jul. 31, 2012.
English Translation of the International Preliminary Report on Patentability, PCT/JP2012/065048, Dec. 17, 2013.

* cited by examiner

Primary Examiner — Maria Veronica Ewald
Assistant Examiner — Travis Figg
(74) Attorney, Agent, or Firm — Kagan Binder, PLLC

(57) ABSTRACT

Objects of the present invention are: to obtain a polyimide that is excellent in heat resistance, transparency, and optical isotropy and is soluble in an organic solvent; to provide, by using either a polyimide or a polyamic acid which is a precursor or the polyimide, a product or a member that is highly required to have heat resistance and transparency; and particularly to provide a product and a member both of which are obtained by applying a polyamic acid solution and a polyimide solution of the present invention to the surface of an inorganic substance such as glass, metal, metal oxide, or a single crystal silicon. These objects can be attained by a polyimide acid and a polyimide which are each prepared from an alicyclic tetracarboxylic dianhydride and a monomer having a fluorene structure.

16 Claims, No Drawings

POLYAMIC ACID, POLYIMIDE, POLYAMIC ACID SOLUTION, POLYIMIDE SOLUTION, POLYIMIDE FILMS OBTAINED FROM THESE SOLUTIONS, AND USE OF POLYIMIDE FILMS

This application claims benefit from International Application No. PCT/JP2012/065048, which was filed on Jun. 12, 2012, which in turn claims priority to Japanese Application No. 2011-131695, which was filed on Jun. 13, 2011, and Japanese Application No. 2012-084691, which was filed on Apr. 3, 2012, wherein the entireties of said patent applications are incorporated herein by reference.

TECHNICAL FIELD

The present invention relates to a polyamic acid, a polyimide, a polyamic acid solution, a polyimide solution, and polyimide films obtained from these solutions. In addition, the present invention relates to the following products using the polyimide films: electronic device materials, TFT substrates, flexible display substrates, color filters, printed materials, optical materials, image display devices such as liquid crystal display devices, organic EL display devices, and electronic paper, three-dimensional displays, solar cells, touch panels, a substrate provided with a transparent conductive film, and alternative material of parts for which glass is currently used.

BACKGROUND ART

In recent years, there have been demands for devices having smaller thickness, lighter weight, and even flexibility in association with rapid progress in electronics such as display devices (e.g., liquid crystal display devices, organic EL display devices, and electronic paper), solar cells, and touch panels. To meet the demands, replacement of glass substrates used in such devices with plastic film substrates capable of achieving smaller thickness, lighter weight, and flexibility has been studied.

These devices have various electronic elements including, for example, a thin film transistor and a transparent electrode formed on the substrates thereof. These electronic elements need to be formed through a high temperature process. Therefore, the plastic film substrates need to have a sufficient heat resistance adaptable to the high temperature process.

Further, the plastic film substrates need to have transparency for the exit of light emitted from display elements through the plastic film substrates (for example, when the plastic film substrates are used for a bottom-emission-type organic EL display). In particular, the plastic film substrates are required to have a high light transmittance in a wavelength range of 400 nm or less within a visible range. Moreover, for the passage of light through a phase difference film and a polarizing plate (provided in, for example, a liquid crystal display and a touch panel), the phase difference film and the polarizing plate are required to have not only transparency but also a high optical isotropy.

Fabrication processes of these devices can be classified into a roll-to-roll type fabrication process and a batch type fabrication process. The use of the roll-to-roll fabrication process requires a new facility and further need to overcome several problems resulting from a rotation and a contact. On the other hand, the batch type fabrication process is a process of applying a coating resin solution on a glass substrate, drying a coating for substrate formation, and then peeling the substrate thus formed. Therefore, the batch type fabrication process can be performed with use of a process facility for a glass substrate such as a current TFT. For this reason, the batch type fabrication process is superior in terms of cost.

Given the circumstances, there has been a strong demand for the development of a material that is adaptable to the existing batch process, excellent in heat resistance, transparency, and optical isotropy, and soluble in a general-purpose organic solvent.

As a material that meets the above demand, a polyimide material known as being excellent in heat resistance has been studied. In a case where a polyimide having a high transparency is to be obtained, an alicyclic monomer is typically used (Patent Documents 1 and 2). Meanwhile, a polyimide having a fluorene structure is known as being effective in exhibiting solubility, controlling optical properties, and offering a stable adhesiveness with time (Patent Documents 3 and 4)

CITATION LIST

Patent Literature 1
Japanese Patent Application Publication, Tokukai, No. 2010-70721 A (Publication Date: Apr. 2, 2010)
Patent Literature 2
WO 2008/010494 (Publication Date: Jan. 24, 2008)
Patent Literature 3
Japanese Patent Application Publication, Tokukai, No. 2010-180349 A (Publication Date: Aug. 19, 2010)
Patent Literature 4
Japanese Patent Application Publication, Tokukai, No. 2010-189578 A (Publication Date: Sep. 2, 2010)

SUMMARY OF INVENTION

Technical Problem

Patent Document 1 discloses a polyimide prepared with an alicyclic monomer and being excellent in heat resistance and transparency, but there is no mention of its solubility in organic solvents and optical properties. Patent Document 2 discloses a polyimide prepared with an alicyclic monomer and having a high solubility in organic solvents, but there is no mention of its transparency and optical properties. In addition, heat resistance is insufficient. Patent Document 3 discloses a polyimide having a fluorene structure, being excellent in heat resistance and transparency, and having solubility in organic solvents. However, the polyimide disclosed by Patent Document 3 has a great phase difference in a thickness direction and therefore fails to have optical isotropy. Patent Document 4 discloses a polyimide having a fluorene structure in which a carboxyl group is provided. Therefore, the polyimide disclosed by Patent Document 4 may have an insufficient heat resistance.

As described previously, among the conventional system containing an alicyclic monomer and the conventional materials having a fluorene structure, a system or material that is excellent not only in heat resistance and transparency but also in solubility in an organic solvent and optical isotropy has never been known.

The present invention was attained in view of the above circumstances and an object of the present invention is to provide a polyimide and a polyamic acid that are each excellent not only in transparency and heat resistance but also in solubility in an organic solvent and optical isotropy. Another object of the present invention is to provide a product or a member which meets high demands for heat resistance and transparency with the use of the polyimide and the polyamic acid, more specifically a product or a member in which the polyimide and polyamic acid of the present invention is provided on a surface of an inorganic material such as glass, metal, a metal oxide, or monocrystalline silicon.

Solution to Problem

The inventors of the present invention found that an effective way for achieving the above object, i.e., an effective way for obtaining a polyimide that is excellent not only in heat resistance and transparency but also in solubility in an organic solvent and optical isotropy is to use a monomer having alicyclic tetracarboxylic dianhydride and a fluorene skeleton.

Specifically, a polyimide according to the present invention has a structure represented by the following General Formula (5):

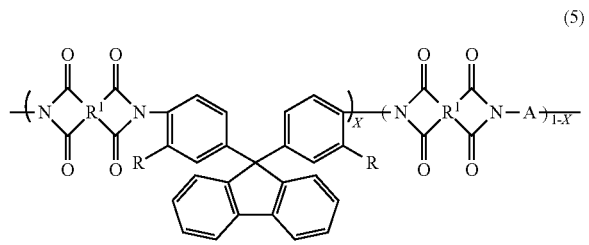

(5)

where each $R^1$ represents independently a tetravalent organic group having an alicyclic hydrocarbon structure, each R is independently selected from the group consisting of a hydrogen atom, a fluorine atom, and a methyl group, A is a divalent organic group having no fluorene skeleton, and X and 1−X represent respective molar fractions of structural units constituting the polyimide and each satisfy 0<X<1.0.

Further, a polyamic acid according to the present invention has a structure represented by the following General Formula (6):

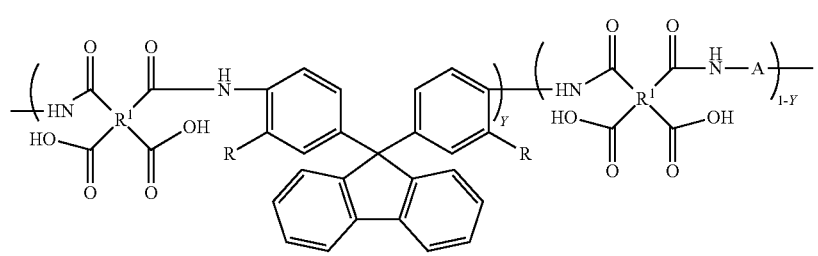

(6)

where each $R^1$ represents independently a tetravalent organic group having an alicyclic hydrocarbon structure, each R is independently selected from the group consisting of a hydrogen atom, a fluorine atom, and a methyl group, A is a divalent organic group having no fluorene skeleton, and Y and 1−Y represent respective molar fractions of structural units constituting a polyimide and each satisfy 0<Y<1.0.

Advantageous Effects of Invention

The polyimide and polyamic acid of the present invention each have optical isotropy as well as heat resistance and transparency. Accordingly, the polyimide and polyamic acid of the present invention are each suitable for a film or a coating film of all publicly-known members which require heat resistance. Moreover, the polyimide and polyamic acid of the present invention are each soluble in various organic solvents, and therefore can be easily applied, in polyimide solution form and polyamic acid solution form, respectively, to various substrates. The polyimide of the present invention is expected to be used, for example, as a material for TFT substrate, a material for ITO substrate, a printed material, a color filter, a flexible display member, an antireflection film, a hologram, an optical member, a building material, or a construction.

DESCRIPTION OF EMBODIMENTS

The following will specifically describe the present invention.

A polyimide produced in accordance with the present invention contains a repeating unit represented by General Formula (5):

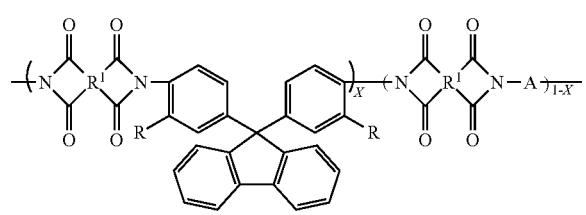

(5)

In General Formula (5), each $R_1$ is not particularly limited to any specific one as long as it is independently a tetravalent organic group having an alicyclic hydrocarbon structure. Such an organic group may have, for example, a monocyclic alicyclic hydrocarbon structure or an alicyclic hydrocarbon structure having a bridged ring. The alicyclic hydrocarbon structure having a bridged ring may be a bicyclic alicyclic hydrocarbon structure or a tricyclic alicyclic hydrocarbon structure.

$R_1$ is a component derived from a dianhydride, and examples of such a dianhydride include 1,2,4,5-cyclohexanetetracarboxylic dianhydride, bicyclo[2.2.2]oct-7-en-2,3,5,6-tetracarboxylic dianhydride, bicyclo[2.2.2]octane 2,3,5,6-tetracarboxylic dianhydride, 1,2,3,4-cyclopentane tetracarboxylic dianhydride, 1,2,3,4-cyclobutane tetracarboxylic dianhydride, 1,3-dimethyl-1,2,3,4-cyclobutane tetracarboxylic dianhydride, 1,4-dimethyl-1,2,3,4-cyclobutane tetracarboxylic dianhydride, and 1,2,3,4-n-butane tetracarboxylic dianhydride. Alternatively, two or more types of these dianhydrides can be used in combination.

Further, in General Formula (5), each R is independently selected from the group consisting of a hydrogen atom, a fluorine atom, and a methyl group. It is more preferable that R is a hydrogen atom or a methyl group in terms of reactivity, and it is further preferable that R is a hydrogen atom in terms of availability. Moreover, it is particularly preferable that R is a methyl group in terms of solubility.

Further, A contained in General Formula (5) is not particularly limited to any specific one as long as it is a divalent organic group having no fluorene skeleton. In particular, A contained in General Formula (5) is preferably a divalent organic group having an ether bond. The divalent organic group having an ether bond is not particularly limited to any specific one as long as it has an ether bond. "A" is a component derived from a diamine, and specific examples of such a diamine include: 4,4'-diaminodiphenyl ether; 3,4'-diaminodiphenyl ether; 2,2-bis(4-aminophenoxyphenyl) propane such as 2,2-bis[4-(4-aminophenoxy)phenyl]propane; 1,4-bis(4-aminophenoxy)benzene; 1,3-bis(4-aminophenoxy)benzene; 1,3-bis(3-aminophenoxy)benzene; and 4,4'-bis(4-aminophenoxy)biphenyl.

In General Formula (5), X and 1−X represent respective molar fractions of structural units constituting the polyimide. In General Formula (5), X satisfies 0<X<1.0. However, from the viewpoint of developing optical isotropy, X satisfies more preferably $0.3 \leq X<1.0$, further preferably $0.5 \leq X<1.0$, still further preferably $0.6 \leq X<1.0$, particularly preferably $0.65 \leq X<1.0$, most preferably $0.7 \leq X<1.0$. Further, from the viewpoint of obtaining a high-molecular-weight polyimide, X satisfies more preferably $0.6 \leq X \leq 0.9$. Note that General Formula (5) is not intended to define the arrangement of two structural units, and these structural units may be arranged at random in a polymer or may be arranged in blocks in the polymer.

A specific example of a polyimide produced in accordance with the present invention is a polyimide having a structure represented by the following General Formula (1):

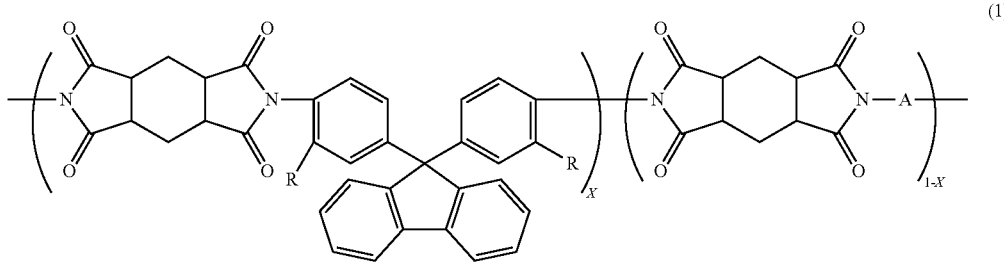

(1)

The polyimide has a structure derived from 1,2,4,5-cyclohexanetetracarboxylic dianhydride. R and A in General Formula (1) are individually independent and are identical to those defined above. Further, X and 1−X in General Formula (1) are as described previously.

A polyamic acid produced in accordance with the present invention contains a repeating unit represented by the following General Formula (6):

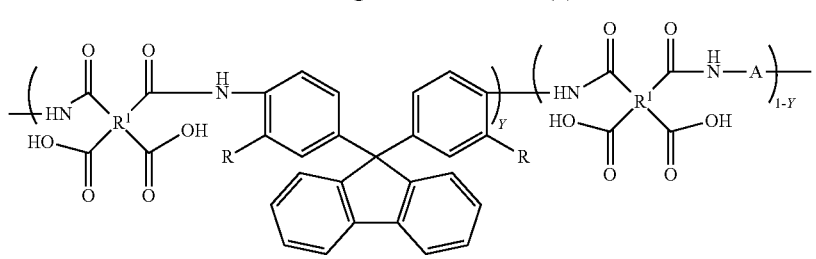

(6)

In General Formula (6), $R^1$ and R are individually independent and identical to those defined above. Further, A in General Formula (6) is identical to that defined above. In General Formula (6), Y and 1−Y represent respective molar fractions of structural units constituting the polyamic acid. In General Formula (6), Y satisfies 0<Y<1.0. However, from the viewpoint of developing optical isotropy, Y satisfies more preferably $0.3 \leq Y<1.0$, further preferably $0.5 \leq Y<1.0$, still further preferably $0.6 \leq Y<1.0$, particularly preferably $0.65 \leq Y<1.0$, most preferably $0.7 \leq Y<1.0$. Further, from the viewpoint of obtaining a high-molecular-weight polyimide, Y satisfies more preferably $0.6 \leq Y \leq 0.9$. Note that General Formula (6) is not intended to define the arrangement of two structural units, and these structural units may be arranged at random in a polymer or may be arranged in blocks in the polymer.

A specific example of a polyamic acid produced in accordance with the present invention is a polyamic acid having a structure represented by the following General Formula (2):

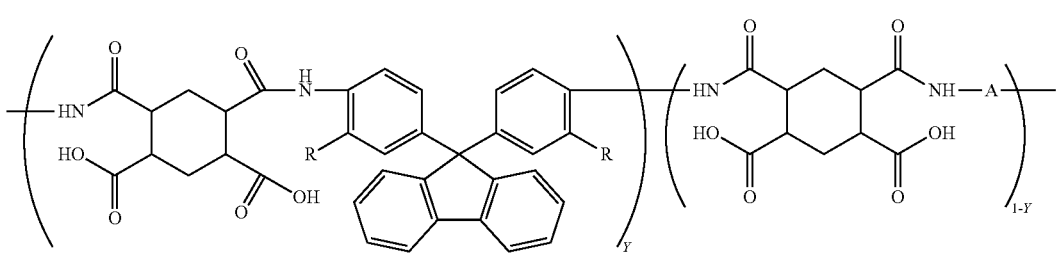

(2)

The polyamic acid has a structure derived from 1,2,4,5-cyclohexanetetracarboxylic dianhydride. R and A in General Formula (2) are individually independent and identical to those defined above. Further, Y and 1−Y in General Formula (2) are as described previously.

A polyamic acid of the present invention can be synthesized by a common method known to the public and can be obtained by reaction of diamine and tetracarboxylic dianhydride in an organic solvent. More specifically, for example, a diamine solution is prepared by dissolving diamine in an organic solvent or dispersing diamine in slurry form in the organic solvent, in an inert atmosphere, such as an argon atmosphere or a nitrogen atmosphere. Meanwhile, the tetracarboxylic dianhydride may be dissolved in an organic solvent or dispersed in slurry form in the organic solvent (alternatively, the tetracarboxylic dianhydride may be in a solid state) and then added to the diamine solution. As a matter of course, a method for reacting diamine and tetracarboxylic dianhydride is not limited to the above-described method. The manner and order of addition can be selected as appropriate.

In the case where diamine and tetracarboxylic dianhydride are used to synthesize a polyamic acid, it is possible to optionally obtain a polyamic acid copolymer by adjusting the number of moles of a total amount of one or more diamine components and the number of moles of a total amount of one or more tetracarboxylic dianhydride components are adjusted so as to be substantially equal to each other. A Temperature condition for the reaction of the diamine and the tetracarboxylic dianhydride (synthesis reaction of the polyamide acid) is not particularly limited, but is preferably 80° C. or lower, more preferably in a range from 0° C. to 50° C. The temperature of 80° C. or lower for the reaction is less likely to dissolve a polyamide acid. The temperature of 0° C. or higher for the reaction is less likely to retard the progress of the polymerization reaction. Further, a reaction time may be set as appropriate in the range from 10 minutes to 30 hours.

Furthermore, the organic solvent used in the synthesis reaction of the polyamic acid is not particularly limited as long as it is an organic polar solvent. As the reaction of diamine and tetracarboxylic dianhydride proceeds, the generation of a polyamic acid occurs, thus increasing the viscosity of the reaction solution. As will be described later, a polyamic acid solution, which has been obtained by synthesis of the polyamic acid, is heated under a reduced pressure. This makes it possible to concurrently perform removal of the organic solvent and imidization. Considering this, it is advantageous in productivity in the process to select, as the organic solvent, an organic solvent being capable of dissolving the polyamic acid and having a low boiling point as possible.

Specifically, examples of the organic solvent used in the synthesis reaction of the polyamic acid include: formamide type solvents such as N,N-dimethylformamide; acetamide type solvents such as N,N-dimethylacetamide; pyrrolidone type solvents such as N-methyl-2-pyrrolidone and N-vinyl-2-pyrrolidone; ester type solvents such as γ-butyrolactone; and ether type solvents such as tetrahydrofuran, dioxane, and dioxolane.

A reaction solvent used for polymerization of the polyamic acid is preferably a solvent capable of dissolving tetracarboxylic dianhydride and diamines, both of which are used for the reaction, and is more preferably a solvent capable of dissolving a generated polyamic acid as well as the tetracarboxylic dianhydride and diamines. Examples of the reaction solvent used for polymerization of the polyamic acid include: urea type solvents such as tetramethylurea and N,N-dimethylethylurea; sulfoxide or sulfone type solvents such as dimethyl sulfoxide, diphenylsulfone, and tetramethylsulfone; ester type solvents such as N,N-dimethylacetamide (DMAc), N,N-dimethylformamide (DMF), N,N′-diethylacetamide, N-methyl-2-pyrrolidone (NMP), and γ-butyrolactone (GBL); amide type solvents such as hexamethylphosphoric triamide; alkyl halide type solvents such as chloroform and methylene chloride; aromatic hydrocarbon type solvents such as benzene and toluene; phenol type solvents such as phenol and cresol; ketone type solvents such as cyclopentanone; and ether type solvents such as tetrahydrofuran, 1,3-dioxolane, 1,4-dioxane, dimethyl ether, diethyl ether, and p-cresol methyl ether. Although these solvents are normally used alone, an appropriate combination of two or more kinds of these solvents may be used according to need. The amide type solvent such as DMF, DMAc or NMP is preferably used in order to increase solubility and reactivity of the polyamic acid.

A polyimide of the present invention can be obtained from a polyamic acid that is a precursor thereof. The following will describe a method for imidizing the polyamic acid to obtain a polyimide by using the polyamic acid. Imidization is carried out by cyclodehydration of the polyamic acid. The cyclodehydration can be carried out by an azeotropic method using an azeotrope solvent, a thermal method, or a chemical method, Further, a percentage of imidization of the polyamic acid in a polyimide can take any value from 1% to 100%. That is, a polyamic acid partially imidized may be synthesized.

Cyclodehydration using the thermal method may be performed by heating a polyamic acid solution containing a polyamic acid and an organic solvent. Alternatively, cyclodehydration of the polyamic acid can be carried out by casting or applying the polyamic acid solution in or on a support such as a glass plate, a metal plate, or PET (polyethyleneterephthalate) and then subjecting the polyamic acid solution to thermal treatment at temperatures in the range from 80° C. to 500° C. Further alternatively, cyclodehydration of the polyamic acid can be carried out by directly introducing a polyamic acid solution into a container which has been subjected to release treatment, such as coating with a fluorine-based resin, and then drying the polyamic acid solution by heating under a reduced pressure. By cyclodehydration using any one of the above thermal methods, it is possible to obtain a polyimide. A heating time in each of the processes varies depending on a heating temperature and the amount of polyamide acid solution to be treated for cyclodehydration. However, in general, the heating time is preferably in the range from 1 minute to 5 hours after a treatment temperature reaches a maximum temperature.

Further, the azeotropic method using an azeotrope solvent may be carried out in the following manner. That is, a solvent forming azeotrope with water, such as toluene or xylene, is added to a polyamic acid solution. The mixture solution is raised to a temperature ranging from 170° C. to 200° C. and then is reacted for about 1 hour to 5 hours while water generated by cyclodehydration is actively removed to outside of the system. After completion of the reaction, a precipitate is formed in a poor solvent such as alcohol, and, if necessary, the precipitate thus formed is washed with alcohol or the like. Thereafter, drying is carried out to obtain a polyimide.

On the other hand, cyclodehydration using the chemical method can be carried out in the following manner. That is, a dehydration catalyst and an imidizing agent are added to the polyamic acid solution to obtain a reaction solvent. In the reaction solvent thus obtained, imidization of a polyamic acid is completed. Thereafter, a poor solvent is added to the reaction solvent to obtain a polyimide in solid form.

The imidizing agent can be a tertiary amine, more preferably a heterocyclic tertiary amine. Preferable specific examples of the heterocyclic tertiary amine encompass pyridine, picoline, quinoline, and isoquinoline. Preferable specific examples of the dehydration catalyst encompass acetic anhydride, propionic anhydride, n-butyric anhydride, benzoic anhydride, and trifluoroacetic anhydride.

The imidizing agent is preferably added in an amount of 0.5 to 5.0 molar equivalent, more preferably 0.7 to 2.5 molar equivalent, especially preferably 0.8 to 2.0 molar equivalent with respect to the amide group of the polyamic acid. The dehydration catalyst is preferably added in an amount of 0.5 to 10.0 molar equivalent, more preferably 0.7 to 5.0 molar equivalent, especially preferably 0.8 to 3.0 molar equivalent with respect to the amide group of the polyamic acid. The imidizing agent and the dehydration catalyst may be directly added to the polyamic acid solution without dissolving them in a solvent or may be added to the polyamic acid solution by adding a solvent in which the imidizing agent and the dehydration catalyst are dissolved. In the case of directly adding the imidizing agent and the dehydration catalyst to the polyamic acid solution, gel formation would take place because the reaction may rapidly progress before the imidizing agent and the dehydration catalyst are diffused. As such, it is preferable that the imidizing agent and the dehydration catalyst dissolved in a solvent be mixed with the polyamic acid solution.

As described above, an imidizing agent and a dehydration catalyst are added to a polyamic acid, and after imidization of the polyamic acid in the reaction solvent is completed, a resultant solution may be used as a polyimide solution. Alternatively, a poor solvent may be introduced into the reaction solvent, so that a polyimide is obtained in solid form. In this case, the solid-form polyimide may be isolated or deposited by introducing a poor solvent into a polyimide solution which contains a polyimide, an imidizing agent, and a dehydration catalyst. The polyimide can be a material of a solid-form including a powder form, a flake form, and other various forms. The polyimide has an average particle diameter of preferably 5 mm or smaller, more preferably 3 mm or smaller, especially preferably 1 mm or smaller.

The poor solvent for the polyimide used in the present invention can be a solvent which does not dissolve the polyimide and which is miscible with the organic solvent used as a solvent for dissolving the polyimide. Examples of the poor solvent include water, methyl alcohol, ethyl alcohol, 2-propyl alcohol, ethylene glycol, triethylene glycol, 2-butyl alcohol, 2-pentyl alcohol, 2-hexyl alcohol, cyclopentyl alcohol, cyclohexyl alcohol, phenol, and t-butyl alcohol. Out of these alcohols, the alcohols such as 2-propyl alcohol, 2-butyl alcohol, 2-pentyl alcohol, phenol, cyclopentyl alcohol, cyclohexyl alcohol, and t-butyl alcohol are preferably used, from the viewpoint of high stability of isolated polyimide and high imidization ratio. Especially, 2-pentyl alcohol is preferably used.

At the time of introducing a polyimide solution containing a polyimide, the imidizing agent, and the dehydration catalyst into the poor solvent, a concentration of a solid content in the polyimide solution is not particularly limited as long as the polyimide solution has a viscosity to such an extent that the polyimide solution can be stirred. However, the polyimide solution is preferably diluted from the viewpoint of making a particle diameter smaller. Note that the term "solid content" refers to all components other than a solvent, and the term "concentration of a solid content" refers to a concentration (% by weight) of a solid content in the whole solution.

The concentration of a solid content in the polyimide solution is preferably 5% or higher to prevent the amount of poor solvent for deposition of a polyimide from becoming too large. It is preferable that before the polyimide solution is introduced into a poor solvent, the polyimide solution is diluted so that the concentration of the solid content in the polyimide solution becomes 15% or lower, preferably 10% or lower. The poor solvent is preferably used in an amount equal to or larger than an equivalent amount of the polyimide solution, preferably twice to three times larger than the equivalent amount of the polyimide solution. Since the polyimide thus obtained contains a small amount of imidizing agent and dehydrating agent, the polyimide is preferably washed with the poor solvent, especially with an alcohol type solvent such as 2-propyl alcohol.

A method for drying the polyimide thus obtained may be vacuum drying or hot-air drying. Vacuum drying is desirably employed to fully dry the solvent contained in the polyimide. A drying temperature is preferably in the range from 100° C. to 200° C., especially preferably from 120° C. to 180° C.

The weight-average molecular weights of the polyamic acid and the polyimide of the present invention are each preferably in a range from 5000 to 500000, more preferably in a range from 10000 to 500000, further preferably in a range from 10000 to 300000, still further preferably in a range from 20000 to 300000, particularly preferably in a rage from 30000 to 200000 although the weight-average molecular weight varies depending on application of the polyamic acid and the polyimide of the present invention. In a case where the weight-average molecular weights of the polyamic acid and the polyimide are each 5000 or more, more preferably 10000 or more, it is possible to put the polyamic acid and the polyimide into a coating form or a film form. Meanwhile, in a case where the weight-average molecular weights of the polyamic acid and the polyimide are each less than 500000, an increase in viscosity is suppressed, and a sufficient solubility to a solvent is exhibited accordingly. Consequently, a coating or a film obtained from the polyamic acid solution and polyimide solution, both of which will be described later, has a smooth surface and a uniform film thickness.

The molecular weight used herein is a molecular weight in terms of polyethylene glycol determined by gel permeation chromatography (GPC).

In order to obtain a polyimide film from a polyimide of the present invention, it is more preferable to obtain the polyimide film by way of a polyimide solution. More specifically, the process of (i) melting a polyimide once or dissolving the polyimide in an organic solvent and then (ii) forming a polyimide film is more preferable than the process of forming a film of a polyamic acid and then subjecting the film to thermal imidization to thereby obtain a polyimide film. This is because the polyimide film thus obtained is more likely to have a high transparency and is less likely to lower in properties of thermal expansion and dimensional stability.

A polyimide solution of the present invention can be obtained by dissolving the polyimide obtained by the foregoing method in any organic solvent. The organic solvent to be used is not limited in particular, but is preferably at least one selected from amide type solvents such as N,N-dimethylformamide (DMF), N,N-dimethylacetamide (DMAc), and N-methylpyrrolidone (NMP); ketone type solvents such as acetone, methyl ethyl ketone (MEK), methyl isobutyl ketone (MIBK), cyclopentanone, and cyclohexanone; ether type solvents such as tetrahydrofuran (THF), 1,3-dioxolane, and 1,4-dioxane; and ester type solvents such as ethyl acetate and γ-butyrolactone (GBL). The concentration of the polyimide solution of the present invention is preferably in a range from 5% to 40% by weight, more preferably in a range from 5% to 20% by weight.

The viscosities of the polyamic acid solution and the polyimide solution are each appropriately selected in accordance with the thickness of coating and a coating environment, but is preferably in a range from 0.1 Pa·s to 50 Pa·s, more preferably in a range from 0.5 Pa·s to 30 Pa·s. In a case where these viscosities are 0.1 Pa·s or higher, a sufficient film thickness accuracy can be secured. Meanwhile, in a case where the viscosities of the polyamic acid solution and the polyimide solution are 50 Pa·s or lower, the film thickness accuracy can be secured. In addition, any parts of the coating do not dry immediately after the polyamic acid solution or the polyimide solution is applied, and appearance defects such as gel defects do not occur. Note that the above-described viscosities are kinematic viscosities at 23° C. measured by an E-type viscometer.

A polyimide film of the present invention can be produced by applying a coating of a polyamic acid solution or a polyimide solution onto a support and the drying the coating. Here, the polyamic acid solution may be a solution of a polyamic acid partially imidized. Drying may be carried out in air or may be carried out in a nitrogen atmosphere. Drying in a nitrogen atmosphere is preferable in transparency terms.

The support to be coated with the polyamic acid solution or the polyimide solution can be, but is not limited to, a glass substrate, a metal substrate or a metal belt made of a metal such as SUS, a plastic film made of plastic such as polyethylene terephthalate, polycarbonate, polyacrylate, polyethylene naphthalate, and triacetylcellulose, or the like. However, a glass substrate is more preferably used for the sake of providing adaptability to a batch type device-manufacturing process.

A drying temperature during the production of a polyimide film can be selected suitably to a process of the production and is not particularly limited unless the drying temperature affects the properties of the polyimide film obtained.

The transparency of the polyimide film is, for example, expressed by total light transmittance according to JIS K7105-1981 or haze according to JIS K7105-1981. In a case where the polyimide film is to be used in the applications (described later) of the present invention, the total light transmittance of the polyimide film is preferably 85% or more, more preferably 87% or more. The haze is preferably 2.0% or less, more preferably 1.0% or less. The polyimide film, for its use in the applications of the present invention, is required to have high light transmittance in the whole wavelength range. A typical polyimide tends to absorb light in a short wavelength side. Accordingly, a film itself produced from such a polyimide is often colored in yellow. For use in the applications of the present invention, a polyimide film of 10 μm in film thickness preferably has light transmittance of 70% or more, more preferably 80% or more at a wavelength of 400 nm. Further, a polyimide film of 20 μm in film thickness preferably has light transmittance of 70% or more at a wavelength of 400 nm. The light transmittance at a wavelength of 400 nm is measured by an ultra-violet and visible spectrophotometer. A polyimide film given such transparency can be used as, for example, an alternative transparent substrate to glass.

From the viewpoint of heat resistance, a polyimide film has preferably a higher glass transition temperature as possible. Specifically, the glass transition temperature is preferably 250° C. or higher, and, from the viewpoint of endurance to a high process temperature, the glass transition temperature is 300° C. or higher, where the glass transition temperature is measured by differential scanning calorimetry (DSC) or dynamic mechanical spectrometry (DMS) under the condition that a rate of temperature rise is 10° C./min.

As for optical properties of a polyimide film, it is preferable that the polyimide film has a high optical isotropy for the sake of use in the applications of the prevent invention. Being completely optically isotropic means that it holds for:

$nx=ny=nz$ where nx and ny represent highest and lowest refractive indices in an in-plane direction of the polyimide film, respectively, and nz represents a refractive index in a thickness direction of the polyimide film. The polyimide film is more likely to develop in-plane orientation. Accordingly, the refractive index in the in-plane direction of the polyimide film is often different from that in the thickness direction thereof. For use of a polyimide film in the applications of the present invention, $nx-ny<0.0002$ and $(nx+ny)/2-nz<0.005$ are preferably satisfied. Since it is preferable that such a polyimide film has a higher optical isotropy, $nx-ny<0.0001$ and $(nx+ny)/2-nz<0.004$ are more preferably satisfied, $nx-ny<0.0001$ and $(nx+ny)/2-nz<0.0035$ are further preferably satisfied, $nx-ny<0.0001$ and $(nx+ny)/2-nz<0.003$ are particularly preferably satisfied, $nx-ny<0.0001$ and $(nx+ny)/2-nz<0.002$ are most preferably satisfied.

The polyamic acid and polyimide of the present invention may be each used as it is for coating or formation process for producing a product or a member. Alternatively, the polyamic acid and polyimide of the present invention may be each used as a laminated product for use in treatment, such as coating, to a product formed in film form. The polyamic acid and polyimide of the present invention may be each dissolved or dispersed in a solvent as needed and mixed with (i) a photosetting component or a thermosetting component, (ii) non-polymerizable binder resin other than the polyamic acid and polyimide of the present invention, and (iii) other components, so as to prepare a polyamic acid composition and a polyimide resin composition, respectively, to be used for coating or formation process.

In order to give a processing property and a functionality of various kinds to the polyimide composition of the present invention, another organic or inorganic low-molecular or high-molecular compound of various kinds may be added. For example, dye, surfactant, leveling agent, plasticizer, fine particles, sensitizer, or the like can be used. The fine particles may be organic fine particles such as polystyrene and polytetrafluoroethylene and inorganic fine particles such as colloidal silica, carbon, and layer silicate. These fine particles may be porous and may be hollowed. Examples of functions or forms of the fine particles encompass pigment, filler, and fiber, and the like.

The polyimide composition of the present invention generally contains the polyimide represented by General Formula (5) in a range from 60% to 99.9% by weight to the whole solid content of the polyimide composition. Note that what is meant by "99.9% by weight" is "substantially all". The polyimide composition of the present invention preferably contains other optional components in a range from 0.1% to 40% by weight to the whole solid content of the polyimide composition. In a case where the polyimide composition of the present invention contains 0.1% or higher additives by weight, an effect of adding the additives is likely to be obtained. Meanwhile, in a case where the polyimide composition of the present invention contains 40% or lower additives by weight, the characteristics of the polyimide composition are likely to be reflected in a final product. Note that the term "solid content of the polyimide composition" refers to all components other than the solvent. The "solid content" also encompasses a liquid monomer component.

On a surface of the polyimide film of the present invention, various inorganic thin films such as metal oxide and transparent electrode may be formed. A method for forming such inorganic thin films is not limited in particular, and can be, for example, a CVD method or a PVD method such as a sputtering method, a vacuum deposition method, or an ion plating method.

The polyimide film of the present invention has not only the original properties of a polyimide such as heat resistance and insulating property, but also high dimensional stability and high solubility in organic solvents. Accordingly, the polyimide film of the present invention is preferably used in fields/products for which these properties are effective, such as printed materials, color filters, flexible displays, optical films, image display devices such as liquid crystal display devices, organic EL display devices, and electronic paper, three-dimensional displays, touch panels, substrates provided with transparent conductive films, or solar cells, and is more preferably used as an alternative material of parts for which glass is currently used. That is, a polyimide film obtained from a polyimide having the structure represented by General Formula (5) according to the present invention and a polyimide film obtained from a polyamic acid having the structure represented by General Formula (6) according to the present invention, more preferably a polyimide film obtained from a polyimide represented by General Formula (3) shown below, and a polyimide film obtained from a polyamic acid represented by General Formula (4) shown below, where R is a hydrogen atom and A is 4,4'-diaminodiphenyl ether in General Formulae (1) and (2), respectively, can be suitably used, in particular, for substrates, image display devices, optical materials, and electronic device materials. The substrates refer to, for example, TFT substrates, ITO substrates, and flexible display substrates. These image display devices refer to, for example, organic EL display devices, electronic paper, and touch panels. These optical materials refer to, for example, color filters.

Further, a polyimide film obtained from a polyimide and a polyamic film obtained from a polyamic acid, where R is a methyl group and A is 4,4'-diaminodiphenyl ether in General Formulae (1) and (2), respectively, can also be used more suitably in the above applications.

The present invention has the following arrangements.

Aspect 1. A polyimide having a structure represented by the following General Formula (5):

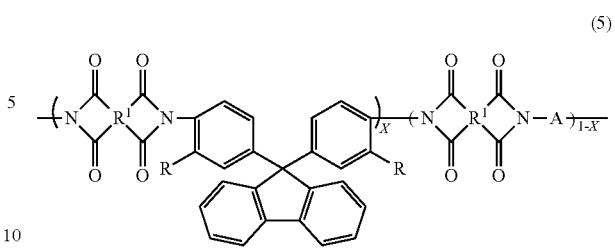

where each $R^1$ represents independently a tetravalent organic group having an alicyclic hydrocarbon structure, each R is independently selected from the group consisting of a hydrogen atom, a fluorine atom, and a methyl group, A is a divalent organic group having no fluorene skeleton, and X and 1−X represent respective molar fractions of structural units constituting the polyimide and each satisfy $0<X<1.0$.

Aspect 2. The polyimide according to aspect 1, wherein the divalent organic group, which is represented by A in the General Formula (5), is a divalent organic group having an ether bond.

Aspect 3. The polyimide according to aspect 1 or 2, wherein
X in the General Formula (5) satisfies $0.3 \leq X<1.0$.

Aspect 4. The polyimide according to any one of aspects 1 through 3, wherein
the divalent organic group represented by A in the General Formula (5) is derived from any diamine selected from the group consisting of 4,4'-diaminodiphenyl ether, 3,4'-diaminodiphenyl ether, 2,2-bis(4-aminophenoxyphenyl)propane, 1,4-bis(4-aminophenoxy)benzene, 1,3-bis(4-aminophenoxy)benzene, 1,3-bis(3-aminophenoxy)benzene, and 4,4'-bis(4-aminophenoxy)biphenyl.

Aspect 5. A polyimide solution comprising:
(i) a polyimide according to any one of aspects 1 through 4; and
(ii) an organic solvent.

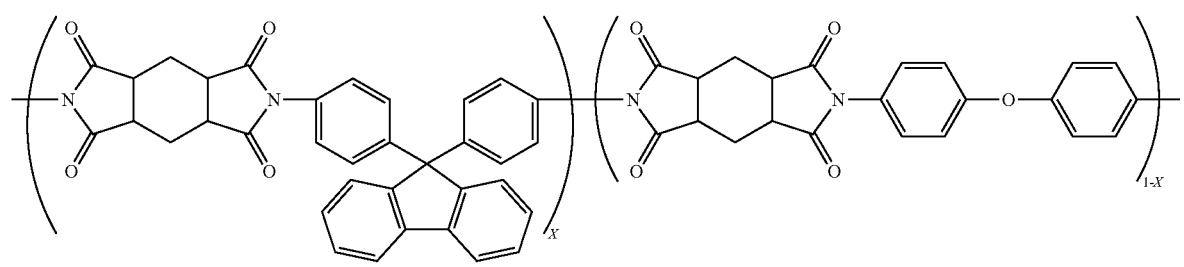

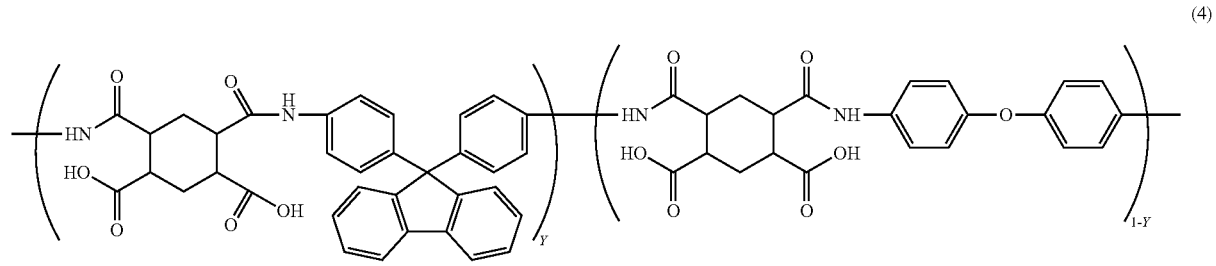

Aspect 6. The polyimide solution according to aspect 5, wherein the organic solvent includes at least one selected from amide type solvents, ketone type solvents, ester type solvents, and ether type solvents.

Aspect 7. A polyamic acid having a structure represented by the following General Formula (6):

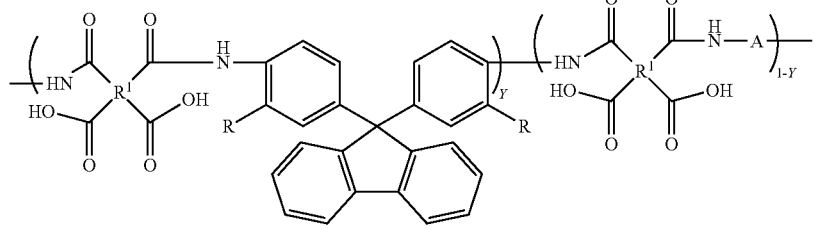

where each $R^1$ represents independently a tetravalent organic group having an alicyclic hydrocarbon structure, each R is independently selected from the group consisting of a hydrogen atom, a fluorine atom, and a methyl group, A is a divalent organic group having no fluorene skeleton, and Y and 1−Y represent respective molar fractions of structural units constituting a polyimide and each satisfy 0<Y<1.0.

Aspect 8. The polyimide according to aspect 7, wherein the divalent organic group, which is represented by A in the General Formula (6), is a divalent organic group having an ether bond.

Aspect 9. The polyamic acid according to aspect 7 or 8, wherein

Y in the General Formula (6) satisfies 0.3≤Y<1.0.

Aspect 10. The polyamic acid according to any one of aspects 7 through 9, wherein the divalent organic group represented by A in the General Formula (6) is derived from any diamine selected from the group consisting of 4,4'-diaminodiphenyl ether, 3,4'-diaminodiphenyl ether, 2,2-bis(4-aminophenoxyphenyl)propane, 1,4-bis(4-aminophenoxy)benzene, 1,3-bis(4-aminophenoxy)benzene, 1,3-bis(3-aminophenoxy)benzene, and 4,4'-bis(4-aminophenoxy)biphenyl.

Aspect 11. The polyamic acid according to any one of aspects 7 through 10, wherein the polyamic acid having the structure represented by the General Formula (6) is partially imidized.

Aspect 12. A polyamic acid solution comprising:
(i) a polyamic acid according to any one of aspects 7 through 11; and
(ii) an organic solvent.

Aspect 13. The polyamic acid solution according to aspect 12, wherein the organic solvent includes at least one selected from amide type solvents, ketone type solvents, ester type solvents, and ether type solvents.

Aspect 14. A polyimide film obtained from a polyimide solution according to aspect 5 or 6.

Aspect 15. A polyimide film obtained from a polyamic acid solution according to aspect 12 or 13.

Aspect 16. The polyimide film according to aspect 14, wherein the polyimide film is obtained by applying the polyimide solution onto a support.

Aspect 17. The polyimide film according to aspect 15, wherein the polyimide film is obtained by applying the polyamic acid solution onto a support.

Aspect 18. The polyimide film according to aspect 16 or 17, wherein the support is a glass substrate.

Aspect 19. The polyimide film according to any one of aspects 14 through 18, wherein when the polyimide film is 10 μm in film thickness, the polyimide film has light transmittance of 70% or more at a wavelength of 400 nm.

Aspect 20. The polyimide film according to any one of aspects 14 through 19, wherein the polyimide film satisfies nx−ny<0.0002 and (nx+ny)/2−nz<0.005, where nx and ny represent highest and lowest refractive indices in an in-plane direction of the polyimide film, respectively, and nz represents a refractive index in a thickness direction of the polyimide film.

Aspect 21. The polyimide film according to any one of aspects 14 through 20, wherein the polyimide film has a glass transition temperature of 250° C. or higher.

Aspect 22. A substrate comprising a polyimide film according to any one of aspects 14 through 21.

Aspect 23. An optical material comprising a polyimide film according to any one of aspects 14 through 21.

Aspect 24. An image display device comprising a polyimide film according to any one of aspects 14 through 21.

Aspect 25. An electronic device material comprising a polyimide film according to any one of aspects 14 through 21.

Alternatively, the present invention has the following arrangements.

Aspect 1. A polyimide having a structure represented by the following General Formula (1):

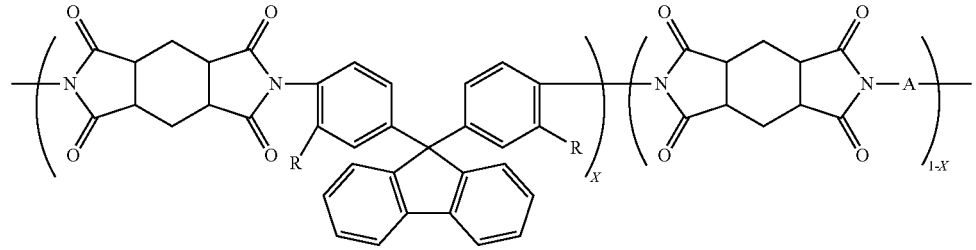

where R is selected from the group consisting of a hydrogen atom, a fluorine atom, and a methyl group, A is a divalent organic group having an ether bond, and each X represents a molar fraction of each structural unit.

Aspect 2. The polyimide according to aspect 1, wherein X in the General Formula (1) satisfies 0.3≤X<1.0.

Aspect 3. The polyimide according to aspect 1 or 2, wherein
the divalent organic group represented by A in the General Formula (1) is derived from any diamine selected from the group consisting of 4,4'-diaminodiphenyl ether, 3,4'-diaminodiphenyl ether, 2,2-bis(4-aminophenoxyphenyl)propane, 1,4-bis(4-aminophenoxy)benzene, 1,3-bis(4-aminophenoxy)benzene, 1,3-bis(3-aminophenoxy)benzene, and 4,4'-bis(4-aminophenoxy)biphenyl.

Aspect 4. A polyimide solution comprising:
(i) a polyimide according to any one of aspects 1 through 3; and
(ii) an organic solvent.

Aspect 5. The polyimide solution according to aspect 4, wherein
the organic solvent includes at least one selected from amide type solvents, ketone type solvents, ester type solvents, and ether type solvents.

Aspect 6. A polyamic acid having a structure represented by the following General Formula (2):

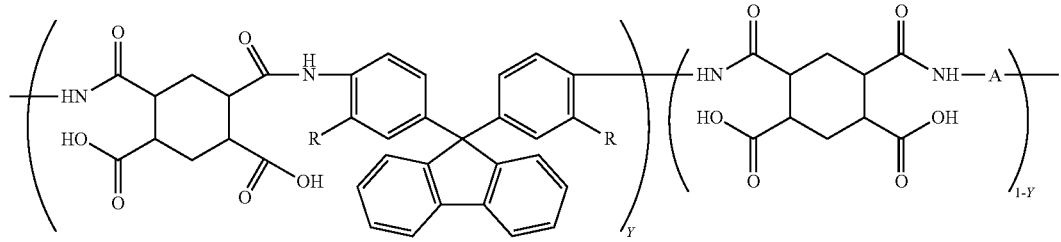

where R is selected from the group consisting of a hydrogen atom, a fluorine atom, and a methyl group, A is as defined above in aspect 1, and each Y represents a molar fraction of each structural unit.

Aspect 7. The polyamic acid according to aspect 6, wherein
Y in the General Formula (2) satisfies 0.3≤Y<1.0.

Aspect 8. The polyamic acid according to aspect 6 or 7, wherein
the divalent organic group represented by A in the General Formula (2) is derived from any diamine selected from the group consisting of 4,4'-diaminodiphenyl ether, 3,4'-diaminodiphenyl ether, 2,2-bis(4-aminophenoxyphenyl)propane, 1,4-bis(4-aminophenoxy)benzene, 1,3-bis(4-aminophenoxy)benzene, 1,3-bis(3-aminophenoxy)benzene, and 4,4'-bis(4-aminophenoxy)biphenyl.

Aspect 9. The polyamic acid according to any one of aspects 6 through 8, wherein
the polyamic acid having the structure represented by the General Formula (2) is partially imidized.

Aspect 10. A polyamic acid solution comprising:
(i) a polyamic acid according to any one of aspects 6 through 9; and
(ii) an organic solvent.

Aspect 11. The polyamic acid solution according to aspect 10, wherein
the organic solvent includes at least one selected from amide type solvents, ketone type solvents, ester type solvents, and ether type solvents.

Aspect 12. A polyimide film obtained from a polyimide solution according to aspect 4 or 5.

Aspect 13. A polyimide film obtained from a polyamic acid solution according to aspect 10 or 11.

Aspect 14. The polyimide film according to aspect 12, wherein
the polyimide film is obtained by applying the polyimide solution onto a support.

Aspect 15. The polyimide film according to aspect 13, wherein
the polyimide film is obtained by applying the polyamic acid solution onto a support.

Aspect 16. The polyimide film according to aspect 14 or 15, wherein
the support is a glass substrate.

Aspect 17. The polyimide film according to any one of aspects 12 through 16, wherein
when the polyimide film is 10 μm in film thickness, the polyimide film has light transmittance of 70% or more at a wavelength of 400 nm.

Aspect 18. The polyimide film according to any one of aspects 12 through 17, wherein
the polyimide film satisfies nx−ny<0.0001 and (nx+ny)/2−nz<0.003, where nx and ny represent highest and lowest refractive indices in an in-plane direction of the polyimide film, respectively, and nz represents a refractive index in a thickness direction of the polyimide film.

Aspect 19. The polyimide film according to any one of aspects 12 through 18, wherein
the polyimide film has a glass transition temperature of 300° C. or higher.

Aspect 20. A substrate comprising a polyimide film according to any one of aspects 12 through 19.

Aspect 21. An optical material comprising a polyimide film according to any one of aspects 12 through 19.

Aspect 22. An image display device comprising a polyimide film according to any one of aspects 12 through 19.

Aspect 23. An electronic device material comprising a polyimide film according to any one of aspects 12 through 19.

EXAMPLES

[Evaluation Method]
The property values, etc. of the materials mentioned herein were obtained by the following evaluation method.
(1) Molecular Weight of Polyimide
The weight-average molecular weight (Mw) was obtained under the conditions shown in Table 1. The result of the evaluation is shown in Table 2.

TABLE 1

| Items | Molecular weight measuring device conditions |
|---|---|
| Device | CO-8020, SD-8022, DP-8020, AS-8020, RI-8020 (each of which is manufactured by Tosoh Corporation) |

TABLE 1-continued

| Items | Molecular weight measuring device conditions |
|---|---|
| Column | Shodex: GPC KD-806M × 2 |
| Column size | Each: 8 mmΦ × 30 cm, total: 60 cm |
| | Guard column (GPC KD-G) 4.6 mmΦ × 1 cm |
| Column temperature | 40° C. |
| Eluent | 30 mM-LiBr + 30 mM-phosphoric acid/DMF |
| Flow rate | 0.6 mL/min |
| Injection pressure | Approximately 1.3 MPa to 1.7 MPa |
| Injection amount | 30 μL (solid content concentration: 0.4% by weight) |
| Reference sample | Polyethylene oxide (used for creation of calibration curve) |
| Detector | RI |
| Calibration curve | Linear |

(2) Solubility Test of Polyimide in Organic Solvent

To 0.5 g of polyimide, 9.5 g of organic solvent (solid content concentration: 5%) was added in a sample tube, and the mixture was stirred by a magnetic stirrer. As organic solvents were used acetone, 1,3-dioxolane, 1,4-dioxane, cyclopentanone, cyclohexanone, γ-butyrolactone (GBL), N-methylpyrrolidone (NMP), N,N-dimethylformamide (DMF), and N,N-dimethylacetamide (DMAc). The case where the polyimide was completely dissolved at 23° C. was evaluated as "G (Good)", the case where the polyimide partially remained undissolved was evaluated as "U (Unsatisfactory)", and the case where the polyimide was not dissolved was evaluated as "P (Poor)". The result of the evaluation is shown in Table 2.

TABLE 2

| Solvent | Mw | Acetone | 1,3-dioxolane | 1,4-dioxane | Cyclopentanone | Cyclohexanone | γ-butyrolactone | NMP | DMF | DMAc |
|---|---|---|---|---|---|---|---|---|---|---|
| Syn. Ex. 1 | 73,000 | P | U | U | G | U | G | G | G | G |
| Syn. Ex. 2 | 82,000 | P | U | U | G | U | G | G | G | G |
| Syn. Ex. 3 | 90,000 | — | — | — | — | — | — | — | — | — |
| Syn. Ex. 4 | 92,000 | — | — | — | — | — | — | — | — | — |
| Syn. Ex. 5 | 90,000 | — | — | — | — | — | — | — | — | — |
| Syn. Ex. 6 | 95,000 | U | U | U | U | U | G | G | G | G |
| Syn. Ex. 7 | 98,000 | P | U | U | U | U | G | G | G | G |
| Syn. Ex. 10 | 25,000 | P | U | U | G | P | G | G | G | G |
| Syn. Ex. 11 | 25,000 | P | U | U | G | U | G | G | G | G |
| Syn. Ex. 12 | 90,000 | P | U | U | G | U | G | G | G | G |
| Syn. Ex. 8 | 80,000 | P | U | U | U | U | G | G | G | G |
| Syn. Ex. 9 | 19,000 | P | U | U | U | U | G | G | G | G |
| Syn. Ex. 13 | 20,000 | P | P | P | P | P | U | G | U | U |

(3) Transmittance of Polyimide Film

The optical transmittance of a polyimide film at a wavelength ranging from 200 nm to 800 nm was measured by using the ultraviolet-visible-near infrared spectrophotometer (V-650) manufactured by JASCO Corporation. The light transmittance at a wavelength of 400 nm was used as an index. Further, a wavelength (cutoff wavelength) at which a transmittance of the polyimide film becomes 0.5% or lower was found.

(4) Glass Transition Temperature (GTT) of Polyimide Film

The amount of change in strain occurred on a film (polyimide film) was measured by using TMA120C manufactured by Seiko Instruments Inc. (A sample (film) having a size of 3 mm in width and 10 mm in length was used. A film thickness of the film was measured, and a cross-sectional area of the film was calculated from the film thickness thus measured.), with a load of 3 g under the condition that a temperature was risen from 10° C. to 400° C. at a rate of 10° C./min. An inflection point of the amount of change in strain was obtained as a glass transition temperature.

(5) Total Light Transmittance of Polyimide Film

The total light transmittance of the polyimide film was measured by using the integrating sphere-type hazemeter 300A manufactured by NIPPON DENSHOKU INDUSTRIES CO., LTD. in accordance with the method described in JIS K7105-1981.

(6) Haze of Polyimide Film

The haze of the polyimide film was measured by using the integrating sphere-type hazemeter 300A manufactured by NIPPON DENSHOKU INDUSTRIES CO., LTD. in accordance with the method described in JIS K7105-1981.

(7) Measurement of Phase Differences

By using OPTIPRO, which is a phase difference measuring instrument manufactured by SHINTECH, Inc., values of front phase difference and thickness phase difference were measured. From the values thus obtained, nx−ny and (nx+ny)/2−nz were calculated.

Synthesis Example 1

<Polymerization of Polyimide>

Into a 500 mL glass separable flask equipped with (i) a stirrer having a stainless stirring rod and (ii) a nitrogen inlet tube, 14.4 g of 9,9-bis(3-methyl-4-aminophenyl)fluorene (hereinafter referred to as BTFL) was introduced. To the BTFL, 70.0 g of DMF that had been dehydrated was added as a solvent for polymerization, and the mixture solution thus obtained was stirred. Subsequently, to the solution, 12.3 g of 1,2,4,5-cyclohexanetetracarboxylic dianhydride (hereinafter referred to as PMDA-HS) was added, and the mixture solution thus obtained was stirred for 1 hour at room temperature (23° C.). Thereafter, to the solution, 3.3 g of 4,4'-diaminodiphenyl ether (hereinafter referred to as 4,4'-ODA) was added, and the mixture solution thus obtained was stirred for 10 hours to thereby obtain a polyamic acid. The monomer feed ratio was as follows: BTFL was 70 mol %; and 4,4'-ODA was 30 mol %, with respect to 100 mol % of PMDA-HS. Note that this reaction solution contained 30% diamine compound and tetracarboxylic dianhydride by weight with respect to the whole reaction solution.

To the above solution, 100.0 g of DMF and 8.6 g of pyridine as an imidization catalyst were added, and the DMF and pyridine were fully diffused. To the solution in which the DMF and pyridine were diffused, 13.4 g of acetic anhydride was added, and the solution thus obtained was stirred for 4 hours at 100° C. The polyimide solution thus obtained was allowed to drip onto 1 L of 2-propyl alcohol (hereinafter referred to as IPA) for deposition. As a result, a powdery polyimide was obtained. The powdery polyimide thus obtained was washed five times with IPA and then dried in vacuum by a vacuum drying device for 12 hours at 120° C. In this way, a polyimide was obtained. The result of evaluation in solubility of the polyimide thus obtained is shown in Table 2.

Example 1

<Preparation of Polyimide Solution and Polyimide Film>
A polyimide solution containing the polyimide synthesized in Synthesis Example 1 in a concentration of 15% by weight was prepared with use of DMAc as a solvent. A coating of the polyimide solution thus prepared was applied onto a glass plate by a bar coater. Subsequently, the coating of the polyimide solution was dried in air for 20 minutes at 80° C., for 1 hour at 150° C., and further for 2 hours at 250° C. As a result, two kinds of polyimide films (15 μm and 10 μm in film thickness) were obtained. The result of evaluation of these polyimide films is shown in Table 3.

Example 2

<Preparation of Polyimide Solution and Polyimide Film>
A polyimide solution containing the polyimide synthesized in Synthesis Example 1 in a concentration of 15% by weight was prepared with use of DMAc as a solvent. A coating of the polyimide solution thus prepared was applied onto a glass plate by a bar coater. Subsequently, the coating of the polyimide solution was dried in air for 20 minutes at 80° C. and then dried in a nitrogen atmosphere for 30 minutes at 150° C. and further for 2 hours at 350° C. As a result, two kinds of polyimide films (15 μm and 10 μm in film thickness) were obtained. The result of evaluation of these polyimide films is shown in Table 3.

TABLE 3

| | Polyimide or Polyamic Acid | Mw *[1] | Solvent | FT*[2] (μm) | Transmittance at 400 nm (%) | Cut Off (nm) | Haze (%) | TLT*[3] (%) | Development of Phase Difference nx − ny | (nx + ny)/ 2 − nz | GTT*[4] Tg (° C.) |
|---|---|---|---|---|---|---|---|---|---|---|---|
| Ex. 1 | Syn. Ex. 1 | 73 | DMAc | 15 | 83 | 314 | 0.3 | 90 | 0.0000 | 0.0020 | 372 |
| | | | | 10 | 84 | 314 | 0.3 | 90 | 0.0000 | 0.0020 | 372 |
| Ex. 2 | Syn. Ex. 1 | 73 | DMAc | 15 | 82 | 314 | 0.6 | 90 | 0.0000 | 0.0017 | 372 |
| | | | | 10 | 83 | 314 | 0.5 | 90 | 0.0000 | 0.0016 | 372 |
| Ex. 3 | Syn. Ex. 1 | 73 | GBL | 10 | 83 | 314 | 0.3 | 90 | 0.0000 | 0.0020 | 372 |
| Ex. 4 | Syn. Ex. 1 | 73 | GBL | 10 | 82 | 314 | 0.4 | 90 | 0.0000 | 0.0020 | 372 |
| Ex. 5 | Syn. Ex. 2 | 82 | DMAc | 10 | 86 | 314 | 0.3 | 90 | 0.0000 | 0.0017 | 380 |
| Ex. 6 | Syn. Ex. 2 | 82 | DMAc | 10 | 85 | 314 | 0.4 | 90 | 0.0000 | 0.0020 | 380 |
| Ex. 7 | Syn. Ex. 2 | 82 | GBL | 10 | 85 | 314 | 0.4 | 90 | 0.0000 | 0.0022 | 380 |
| Ex. 8 | Syn. Ex. 3 | 90 | DMAc | 10 | 83 | 314 | 0.5 | 90 | 0.0000 | 0.0010 | 370 |
| Ex. 9 | Syn. Ex. 4 | 92 | DMAc | 10 | 82 | 314 | 0.5 | 90 | 0.0000 | 0.0008 | 380 |
| Ex. 10 | Syn. Ex. 5 | 90 | GBL | 10 | 81 | 315 | 0.6 | 89 | 0.0000 | 0.0008 | 380 |
| Ex. 11 | Syn. Ex. 6 | 95 | GBL | 10 | 85 | 313 | 0.4 | 90 | 0.0000 | 0.0045 | 370 |
| Ex. 12 | Syn. Ex. 6 | 95 | GBL | 10 | 85 | 313 | 0.5 | 90 | 0.0000 | 0.0025 | 370 |
| Ex. 13 | Syn. Ex. 7 | 98 | GBL | 10 | 86 | 313 | 0.4 | 90 | 0.0000 | 0.0075 | 355 |
| Ex. 14 | Syn. Ex. 7 | 98 | GBL | 10 | 85 | 313 | 0.5 | 90 | 0.0000 | 0.0040 | 355 |
| Ex. 15 | Syn. Ex. 10 | 25 | GBL | 10 | 80 | 312 | 0.3 | 90 | 0.0000 | 0.0030 | 425 |
| Ex. 16 | Syn. Ex. 11 | 25 | GBL | 10 | 76 | 312 | 0.4 | 90 | 0.0000 | 0.0043 | 370 |
| Ex. 17 | Syn. Ex. 12 | 90 | GBL | 10 | 85 | 310 | 0.4 | 90 | 0.0000 | 0.0085 | 335 |
| Com. Ex. 1 | Syn. Ex. 8 | 80 | DMAc | 17 | 82 | 291 | 0.5 | 90 | 0.0001 | 0.0100 | 314 |
| | | | | 10 | 83 | 290 | 0.5 | 90 | 0.0000 | 0.0100 | 314 |
| Com. Ex. 2 | Syn. Ex. 8 | 80 | GBL | 19 | 81 | 291 | 0.5 | 90 | 0.0001 | 0.0090 | 314 |
| | | | | 10 | 83 | 290 | 0.4 | 90 | 0.0000 | 0.0090 | 314 |
| Com. Ex. 3 | Syn. Ex. 9 | 19 | GBL, DMAc | — | — | — | — | — | — | — | — |
| Com. Ex. 4 | Syn. Ex. 13 | 20 | NMP | 10 | 58 | 291 | 0.8 | 87 | 0.0000 | 0.0160 | 370 |
| Com. Ex. 5 | Syn. Ex. 14 | 10 | DMAc | 10 | 86 | 291 | 0.4 | 90 | 0.0000 | 0.0064 | 367 |

*[1] All amounts are in thousands of molar weight
*[2] Abbreviation for Film Thickness
*[3] Abbreviation for Total Light Transmittance
*[4] Abbreviation for Glass Transition Temperature

Example 3

<Preparation of Polyimide Solution and Polyimide Film>
A polyimide solution containing the polyimide synthesized in Synthesis Example 1 in a concentration of 15% by weight was prepared with use of GBL as a solvent. A coating of the polyimide solution thus prepared was applied onto a glass plate by a bar coater. Subsequently, the coating of the polyimide solution was dried in air for 20 minutes at 80° C., for 1 hour at 150° C., and further for 2 hours at 250° C. As a result, a polyimide film of 10 μm in film thickness was obtained. The result of evaluation of the polyimide film is shown in Table 3.

Example 4

<Preparation of Polyimide Solution and Polyimide Film>
A polyimide solution containing the polyimide synthesized in Synthesis Example 1 in a concentration of 15% by weight was prepared with use of GBL as a solvent. A coating of the polyimide solution thus prepared was applied onto a glass plate by a bar coater. Subsequently, the coating of the polyimide solution was dried in air for 20 minutes at 80° C. and then dried in a nitrogen atmosphere for 30 minutes at 150° C. and further for 2 hours at 350° C. As a result, a polyimide film of 10 μm in film thickness was obtained. The result of evaluation of the polyimide film is shown in Table 3.

Synthesis Example 2

<Polymerization of Polyimide>
Into a 500 mL glass separable flask equipped with (i) a stirrer having a stainless stirring rod and (ii) a nitrogen inlet tube, 13.9 g of 9,9-bis(4-aminophenyl)fluorene (hereinafter referred to as BAFL) was introduced. To the BAFL, 70.0 g of DMF that had been dehydrated was added as a solvent for polymerization, and the mixture solution thus obtained was stirred. Subsequently, to the solution, 12.7 g of PMDA-HS was added, and the mixture solution thus obtained was stirred for 1 hour at room temperature (23° C.). Thereafter, to the solution, 3.4 g of 4,4'-ODA was added, and the mixture solution thus obtained was stirred for 10 hours to thereby obtain a polyamic acid. The monomer feed ratio was as follows: BAFL was 70 mol %; and 4,4'-ODA was 30 mol %, with respect to 100 mol % of PMDA-HS. Note that this reaction solution contained 30% diamine compound and tetracarboxylic dianhydride by weight with respect to the whole reaction solution.

To the above solution, 100.0 g of DMF and 9.0 g of pyridine as an imidization catalyst were added, and the DMF and pyridine were fully diffused. To the solution in which the DMF and pyridine were diffused, 14.0 g of acetic anhydride was added, and the solution thus obtained was stirred for 4 hours at 100° C. The polyimide solution thus obtained was allowed to drip onto 1 L of 2-propyl alcohol (hereinafter referred to as IPA) for deposition. As a result, a powdery polyimide was obtained. The powdery polyimide thus obtained was washed five times with IPA and then dried in vacuum by a vacuum drying device for 12 hours at 120° C. In this way, a polyimide was obtained. The result of evaluation of the polyimide thus obtained is shown in Table 2.

Example 5

<Preparation of Polyimide Solution and Polyimide Film>
A polyimide solution containing the polyimide synthesized in Synthesis Example 2 in a concentration of 15% by weight was prepared with use of DMAc as a solvent. A coating of the polyimide solution thus prepared was applied onto a glass plate by a bar coater. Subsequently, the coating of the polyimide solution was dried in air for 20 minutes at 80° C., for 1 hour at 150° C., and further for 2 hours at 250° C. As a result, a polyimide film of 10 μm in film thickness was obtained. The result of evaluation of the polyimide film is shown in Table 3.

Example 6

<Preparation of Polyimide Solution and Polyimide Film>
A polyimide solution containing the polyimide synthesized in Synthesis Example 2 in a concentration of 15% by weight was prepared with use of DMAc as a solvent. A coating of the polyimide solution thus prepared was applied onto a glass plate by a bar coater. Subsequently, the coating of the polyimide solution was dried in air for 20 minutes at 80° C. and then dried in a nitrogen atmosphere for 30 minutes at 150° C. and further for 2 hours at 350° C. As a result, a polyimide film of 10 μm in film thickness was obtained. The result of evaluation of the polyimide film is shown in Table 3.

Example 7

<Preparation of Polyimide Solution and Polyimide Film>
A polyimide solution containing the polyimide synthesized in Synthesis Example 2 in a concentration of 15% by weight was prepared with use of GBL as a solvent. A coating of the polyimide solution thus prepared was applied onto a glass plate by a bar coater. Subsequently, the coating of the polyimide solution was dried in air for 20 minutes at 80° C., for 1 hour at 150° C., and further for 2 hours at 250° C. As a result, a polyimide film of 10 μm in film thickness was obtained. The result of evaluation of the polyimide film is shown in Table 3.

Synthesis Example 3

<Polymerization of Polyamic Acid>
Into a 500 mL glass separable flask equipped with (i) a stirrer having a stainless stirring rod and (ii) a nitrogen inlet tube, 14.4 g of BTFL was introduced. To the BTFL, 170.0 g of DMAc that had been dehydrated was added as a solvent for polymerization, and the mixture solution thus obtained was stirred. Subsequently, to the solution, 12.3 g of PMDA-HS was added, and the mixture solution thus obtained was stirred for 1 hour at room temperature (23° C.). Thereafter, to the solution, 3.3 g of 4,4'-ODA was added, and the mixture solution thus obtained was stirred for 10 hours to thereby obtain a polyamic acid. The monomer feed ratio was as follows: BTFL was 70 mol %; and 4,4'-ODA was 30 mol %, with respect to 100 mol % of PMDA-HS. Note that this reaction solution contained 15% diamine compound and tetracarboxylic dianhydride by weight with respect to the whole reaction solution.

Example 8

A coating of the polyamic acid solution thus polymerized in Synthesis Example 3 was applied onto a glass plate by a bar coater. Subsequently, the coating of the polyamic acid solution was dried in air for 30 minutes at 80° C. and then dried in a nitrogen atmosphere for 1 hour at 350° C. As a result, a polyimide film of 10 μm in film thickness was obtained. The result of evaluation of the polyimide film is shown in Table 3.

Synthesis Example 4

<Polymerization of Polyamic Acid>
Into a 500 mL glass separable flask equipped with (i) a stirrer having a stainless stirring rod and (ii) a nitrogen inlet tube, 13.9 g of BAFL was introduced. To the BAFL, 170.0 g of DMAc that had been dehydrated was added as a solvent for polymerization, and the mixture solution thus obtained was stirred. Subsequently, to the solution, 12.7 g of PMDA-HS was added, and the mixture solution thus obtained was stirred for 1 hour at room temperature (23° C.). Thereafter, to the solution, 3.4 g of 4,4'-ODA was added, and the mixture solution thus obtained was stirred for 10 hours to thereby obtain a polyamic acid. The monomer feed ratio was as follows: BAFL was 70 mol %; and 4,4'-ODA was 30 mol %, with respect to 100 mol % of PMDA-HS. Note that this reaction solution contained 15% diamine compound and tetracarboxylic dianhydride by weight with respect to the whole reaction solution.

Example 9

A coating of the polyamic acid solution thus polymerized in Synthesis Example 4 was applied onto a glass plate by a bar coater. Subsequently, the coating of the polyamic acid solution was dried in air for 30 minutes at 80° C. and then dried in a nitrogen atmosphere for 1 hour at 350° C. As a result, a polyimide film of 10 μm in film thickness was obtained. The result of evaluation of the polyimide film is shown in Table 3.

Synthesis Example 5

<Polymerization of Polyamic Acid>
Into a 500 mL glass separable flask equipped with (i) a stirrer having a stainless stirring rod and (ii) a nitrogen inlet tube, 13.9 g of BAFL was introduced. To the BAFL, 170.0 g of GBL that had been dehydrated was added as a solvent for polymerization, and the mixture solution thus obtained was stirred. Subsequently, to the solution, 12.7 g of PMDA-HS was added, and the mixture solution thus obtained was stirred for 1 hour at room temperature (23° C.). Thereafter, to the solution, 3.4 g of 4,4'-ODA was added, and the mixture solution thus obtained was stirred for 10 hours to thereby obtain a polyamic acid. The monomer feed ratio was as follows: BAFL was 70 mol %; and 4,4'-ODA was 30 mol %, with respect to 100 mol % of PMDA-HS. Note that this reaction solution contained 15% diamine compound and tetracarboxylic dianhydride by weight with respect to the whole reaction solution.

Example 10

A coating of the polyamic acid solution thus polymerized in Synthesis Example 5 was applied onto a glass plate by a bar coater. Subsequently, the coating of the polyamic acid solution was dried in air for 30 minutes at 80° C. and then dried in a nitrogen atmosphere for 1 hour at 350° C. As a result, a polyimide film of 10 μm in film thickness was obtained. The result of evaluation of the polyimide film is shown in Table 3.

Synthesis Example 6

<Polymerization of Polyamic Acid>
Into a 500 mL glass separable flask equipped with (i) a stirrer having a stainless stirring rod and (ii) a nitrogen inlet tube, 12.2 g of BAFL was introduced. To the BAFL, 120.0 g of GBL that had been dehydrated was added as a solvent for polymerization, and the mixture solution thus obtained was stirred. Subsequently, to the solution, 13.1 g of PMDA-HS was added, and the mixture solution thus obtained was stirred for 1 hour at room temperature (23° C.). Thereafter, to the solution, 4.7 g of 4,4'-ODA was added, and the mixture solution thus obtained was stirred for 10 hours to thereby obtain a polyamic acid. The monomer feed ratio was as follows: BAFL was 60 mol %; and 4,4'-ODA was 40 mol %, with respect to 100 mol % of PMDA-HS. Note that this reaction solution contained 20% diamine compound and tetracarboxylic dianhydride by weight with respect to the whole reaction solution.

<Synthesis of Polyimide>
To the above solution, 150.0 g of GBL and 23.0 g of pyridine as an imidization catalyst were added, and the GBL and pyridine were fully diffused. To the solution in which the GBL and pyridine were diffused, 30.0 g of acetic anhydride was added, and the solution thus obtained was stirred for 12 hours at room temperature (23° C.). The polyimide solution thus obtained was allowed to drip onto 1 L of IPA for deposition. As a result, a powdery polyimide was obtained. The powdery polyimide thus obtained was washed five times with IPA and then dried in vacuum by a vacuum drying device for 12 hours at 120° C. In this way, a polyimide was obtained. The result of evaluation of the polyimide thus obtained is shown in Table 2.

Example 11

<Preparation of Polyimide Solution and Polyimide Film>
A polyimide solution containing the polyimide synthesized in Synthesis Example 6 in a concentration of 15% by weight was prepared with use of GBL as a solvent. A coating of the polyimide solution thus prepared was applied onto a glass plate by a bar coater. Subsequently, the coating of the polyimide solution was dried in air for 30 minutes at 100° C. and then dried in a nitrogen atmosphere for 1 hour at 350° C. As a result, a polyimide film of 10 μm in film thickness was obtained. The result of evaluation of the polyimide film is shown in Table 3.

Example 12

The polyamic acid solution thus polymerized in Synthesis Example 6 was diluted with GBL to adjust a polyamic acid concentration to 15% by weight. Thereafter, a coating of the polyamic acid solution thus adjusted was applied onto a glass plate by a bar coater. Subsequently, the coating of the polyamic acid solution was dried in air for minutes at 100° C. and then dried in a nitrogen atmosphere for 1 hour at 350° C. As a result, a polyimide film of 10 μm in film thickness was obtained. The result of evaluation of the polyimide film is shown in Table 3.

Synthesis Example 7

<Polymerization of Polyamic Acid>
Into a 500 mL glass separable flask equipped with (i) a stirrer having a stainless stirring rod and (ii) a nitrogen inlet tube, 10.5 g of BAFL was introduced. To the BAFL, 120.0 g of GBL that had been dehydrated was added as a solvent for polymerization, and the mixture solution thus obtained was stirred. Subsequently, to the solution, 13.5 g of PMDA-HS was added, and the mixture solution thus obtained was stirred for 1 hour at room temperature (23° C.). Thereafter, to the solution, 6.0 g of 4,4'-ODA was added, and the mixture solution thus obtained was stirred for 10 hours to thereby obtain a polyamic acid. The monomer feed ratio was as follows: BAFL was 50 mol %; and 4,4'-ODA was 50 mol %, with respect to 100 mol % of PMDA-HS. Note that this reaction solution contained 20% diamine compound and tetracarboxylic dianhydride by weight with respect to the whole reaction solution.

<Synthesis of Polyimide>
To the above solution, 150.0 g of GBL and 24.0 g of pyridine as an imidization catalyst were added, and the GBL and pyridine were fully diffused. To the solution in which the GBL and pyridine were diffused, 31.0 g of acetic anhydride was added, and the solution thus obtained was stirred for 12 hours at room temperature (23° C.). The polyimide solution thus obtained was allowed to drip onto 1 L of IPA for deposition. As a result, a powdery polyimide was obtained. The powdery polyimide thus obtained was washed five times with IPA and then dried in vacuum by a vacuum drying device for 12 hours at 120° C. In this way, a polyimide was obtained. The result of evaluation of the polyimide thus obtained is shown in Table 2.

Example 13

<Preparation of Polyimide Solution and Polyimide Film>
A polyimide solution containing the polyimide synthesized in Synthesis Example 7 in a concentration of 15% by weight was prepared with use of GBL as a solvent. A coating of the polyimide solution thus prepared was applied onto a glass plate by a bar coater. Subsequently, the coating of the polyimide solution was dried in air for 30 minutes at 100° C. and then dried in a nitrogen atmosphere for 1 hour at 350° C. As a result, a polyimide film of 10 μm in film thickness was obtained. The result of evaluation of the polyimide film is shown in Table 3.

Example 14

The polyamic acid solution thus polymerized in Synthesis Example 7 was diluted with GBL to adjust a polyamic acid concentration to 15% by weight. Thereafter, a coating of the polyamic acid solution thus adjusted was applied onto a glass plate by a bar coater. Subsequently, the coating of the polyamic acid solution was dried in air for minutes at 100° C. and then dried in a nitrogen atmosphere for 1 hour at 350° C. As a result, a polyimide film of 10 μm in film thickness was obtained. The result of evaluation of the polyimide film is shown in Table 3.

Synthesis Example 8

<Polymerization of Polyimide>
Into a 500 mL glass separable flask equipped with (i) a stirrer having a stainless stirring rod and (ii) a nitrogen inlet tube, 14.2 g of 4,4'-ODA was introduced. To the 4,4'-ODA, 70.0 g of DMF that had been dehydrated was added as a solvent for polymerization, and the mixture solution thus obtained was stirred. Subsequently, to the solution, 15.8 g of PMDA-HS was added, and the mixture solution thus obtained was stirred for 10 hour to thereby obtain a polyamic acid. Note that this reaction solution contained 30% diamine compound and tetracarboxylic dianhydride by weight with respect to the whole reaction solution.

To the above solution, 100.0 g of DMF and 11.1 g of pyridine as an imidization catalyst were added, and the DMF and pyridine were fully diffused. To the solution in which the DMF and pyridine were diffused, 17.3 g of acetic anhydride was added, and the solution thus obtained was stirred for 4 hours at 100° C. The polyimide solution thus obtained was allowed to drip onto 1 L of IPA for deposition. As a result, a powdery polyimide was obtained. The powdery polyimide thus obtained was washed five times with IPA and then dried in vacuum by a vacuum drying device for 12 hours at 120° C. In this way, a polyimide was obtained. The result of evaluation of the polyimide thus obtained is shown in Table 2.

Comparative Example 1

A polyimide solution containing the polyimide synthesized in Synthesis Example 8 in a concentration of 15% by weight was prepared with use of DMAc as a solvent. A coating of the polyimide solution thus prepared was applied onto a glass plate by a bar coater. Subsequently, the coating of the polyimide solution was dried for 20 minutes at 80° C., for 1 hour at 150° C., and further for 2 hours at 250° C. As a result, two kinds of polyimide films (17 μm and 10 μm in film thickness) were obtained. The result of evaluation of these polyimide films is shown in Table 3.

Comparative Example 2

<Preparation of Polyimide Solution and Polyimide Film>
A polyimide solution containing the polyimide synthesized in Synthesis Example 8 in a concentration of 15% by weight was prepared with use of GBL as a solvent. A coating of the polyimide solution thus prepared was applied onto a glass plate by a bar coater. Subsequently, the coating of the polyimide solution was dried for 20 minutes at 80° C., for 1 hour at 150° C., and further for 2 hours at 250° C. As a result, two kinds of polyimide films (19 μm and 10 μm in film thickness) were obtained. The result of evaluation of these polyimide films is shown in Table 3.

Synthesis Example 9

Into a 500 mL glass separable flask equipped with (i) a stirrer having a stainless stirring rod and (ii) a nitrogen inlet tube, 18.8 g of BTFL was introduced. To the BTFL, 70 g of DMF that had been dehydrated was added as a solvent for polymerization, and the mixture solution thus obtained was stirred. Subsequently, to the solution, 11.2 g of PMDA-HS was added, and the mixture solution thus obtained was stirred for 10 hour to thereby obtain a polyamic acid. Note that this reaction solution contained 30% diamine compound and tetracarboxylic dianhydride by weight with respect to the whole reaction solution.

To the above solution, 7.9 g of pyridine as an imidization catalyst were added, and the pyridine was fully diffused. To the solution in which the pyridine was diffused, 12.2 g of acetic anhydride was added, and the solution thus obtained was stirred for 4 hours at 100° C. The polyimide solution thus obtained was allowed to drip onto 1 L of IPA for deposition. As a result, a powdery polyimide was obtained. The powdery polyimide thus obtained was washed five times with IPA and then dried in vacuum by a vacuum drying device for 12 hours at 120° C. In this way, a polyimide was obtained. The result of evaluation of the polyimide thus obtained is shown in Table 2.

Comparative Example 3

A polyimide solution containing the polyimide synthesized in Synthesis Example 9 in a concentration of 20% by weight was prepared with use of DMAc and GBL as solvents. A coating of the polyimide solution thus prepared was applied onto a glass plate by a bar coater. Subsequently, the coating of the polyimide solution was dried for 20 minutes at 80° C., for 1 hour at 150° C., and further for 2 hours at 250° C. This caused cracking on the coating of the polyimide solution, thus making it impossible to obtain a polyimide film.

The polyimide films obtained in Examples 1 through 14 had a high transparency, an extremely short cutoff wavelength, a low birefringence, a high glass transition temperature, as compared to the polyimide films obtained in Comparative Examples 1 and 2.

Synthesis Example 10

Into a three-necked flask equipped with (i) a Dean-Stark trap and (ii) a reflux tube, 14.4 g of bicyclo[2.2.2.]oct-7-en-2,3,5,6-tetracarboxylic dianhydride (hereinafter also referred to as BODA), 13.2 g of BAFL, 3.2 g of 4,4'-ODA, 120.0 g of GBL as a solvent for polymerization, 21.5 g of pyridine as an imidization catalyst, and 5.0 g of toluene as a solvent forming azeotrope with water were introduced. The monomer feed ratio was as follows: BAFL was 70 mol %; and 4,4'-ODA was 30 mol %, with respect to 100 mol % of BODA. Note that this reaction solution contained 20% diamine compound and tetracarboxylic dianhydride by weight with respect to the reaction solution (excluding the imidization catalyst and the azeotrope solvent). The mixture solution thus obtained was stirred at room temperature (23° C.) for 1 hour. Thereafter, while stirred, the solution was allowed to react in a nitrogen atmosphere for 5 hours at 180° C. to thereby obtain a polyimide solution. The polyimide solution thus obtained was allowed to drip onto 1 L of IPA for deposition. As a result, a powdery polyimide was obtained. The powdery polyimide thus obtained was washed five times with IPA and then dried in vacuum by a vacuum drying device for 12 hours at 120° C. In this way, a polyimide was obtained. The result of evaluation of the polyimide thus obtained is shown in Table 2.

Example 15

A polyimide solution containing the polyimide synthesized in Synthesis Example 10 in a concentration of 15% by weight was prepared with use of GBL as a solvent. A coating of the polyimide solution thus prepared was applied onto a glass plate by a bar coater. Subsequently, the coating of the polyimide solution was dried in air for 30 minutes at 100° C. and then dried in a nitrogen atmosphere for 1 hour at 350° C. As a result, a polyimide film of 10 μm in film thickness was obtained. The result of evaluation of the polyimide film is shown in Table 3.

Synthesis Example 11

Into a three-necked flask equipped with (i) a Dean-Stark trap and (ii) a reflux tube, 11.8 g of BODA, 8.3 g of BAFL, 9.8 g of 2,2-bis[4-(4-aminophenoxy)phenyl]propane (hereinafter referred to as BAPP), 120.0 g of GBL as a solvent for polymerization, 19.0 g of pyridine as an imidization catalyst, and 5.0 g of toluene as a solvent forming azeotrope with water were introduced. The monomer feed ratio was as follows: BAFL was 50 mol %; and BAPP was 50 mol %, with respect to 100 mol % of BODA. Note that this reaction solution contained 20% diamine compound and tetracarboxylic dianhydride by weight with respect to the reaction solution (excluding the imidization catalyst and the azeotrope solvent). The mixture solution thus obtained was stirred at room temperature (23° C.) for 1 hour. Thereafter, while stirred, the solution was allowed to react in a nitrogen atmosphere for 5 hours at 180° C. to thereby obtain a polyimide solution. The polyimide solution thus obtained was allowed to drip onto 1 L of IPA for deposition. As a result, a powdery polyimide was obtained. The powdery polyimide thus obtained was washed five times with IPA and then dried in vacuum by a vacuum drying device for 12 hours at 120° C. In this way, a polyimide was obtained. The result of evaluation of the polyimide thus obtained is shown in Table 2.

Example 16

A polyimide solution containing the polyimide synthesized in Synthesis Example 11 in a concentration of 15% by weight was prepared with use of GBL as a solvent. A coating of the polyimide solution thus prepared was applied onto a glass plate by a bar coater. Subsequently, the coating of the polyimide solution was dried in air for 30 minutes at 100° C. and then dried in a nitrogen atmosphere for 1 hour at 350° C. As a result, a polyimide film of 10 μm in film thickness was obtained. The result of evaluation of the polyimide film is shown in Table 3.

Synthesis Example 12

<Polymerization of Polyamic Acid>
Into a 500 mL glass separable flask equipped with (i) a stirrer having a stainless stirring rod and (ii) a nitrogen inlet tube, 6.7 g of BAFL was introduced. To the BAFL, 120.0 g of GBL that had been dehydrated was added as a solvent for polymerization, and the mixture solution thus obtained was stirred. Subsequently, to the solution, 14.3 g of PMDA-HS was added, and the mixture solution thus obtained was stirred for 1 hour at room temperature (23° C.). Thereafter, to the solution, 8.9 g of 4,4'-ODA was added, and the mixture solution thus obtained was stirred for 10 hours to thereby obtain a polyamic acid. The monomer feed ratio was as follows: BAFL was 30 mol %; and 4,4'-ODA was 70 mol %, with respect to 100 mol % of PMDA-HS. Note that this reaction solution contained 20% diamine compound and tetracarboxylic dianhydride by weight with respect to the whole reaction solution.
<Synthesis of Polyimide>
To the above solution, 150.0 g of GBL and 25.3 g of pyridine as an imidization catalyst were added, and the GBL and pyridine were fully diffused. To the solution in which the GBL and pyridine were diffused, 33.3 g of acetic anhydride was added, and the solution thus obtained was stirred for 12 hours at room temperature (23° C.). The polyimide solution thus obtained was allowed to drip onto 1 L of IPA for deposition. As a result, a powdery polyimide was obtained. The powdery polyimide thus obtained was washed five times with IPA and then dried in vacuum by a vacuum drying device for 12 hours at 120° C. In this way, a polyimide was obtained. The result of evaluation of the polyimide thus obtained is shown in Table 2.

Example 17

<Preparation of Polyimide Solution and Polyimide Film>
A polyimide solution containing the polyimide synthesized in Synthesis Example 12 in a concentration of 15% by weight was prepared with use of GBL as a solvent. A coating of the polyimide solution thus prepared was applied onto a glass plate by a bar coater. Subsequently, the coating of the polyimide solution was dried in air for 30 minutes at 100° C. and then dried in a nitrogen atmosphere for 1 hour at 350° C. As a result, a polyimide film of 10 μm in film thickness was obtained. The result of evaluation of the polyimide film is shown in Table 3.

Synthesis Example 13

Into a three-necked flask equipped with (i) a Dean-Stark trap and (ii) a reflux tube, 16.6 g of BODA, 13.4 g of 4,4'-ODA, 120.0 g of GBL as a solvent for polymerization, 16.5 g of pyridine as an imidization catalyst, and 5.0 g of toluene as a solvent forming azeotrope with water were introduced. Note that this reaction solution contained 20% diamine compound and tetracarboxylic dianhydride by weight with respect to the reaction solution (excluding the imidization catalyst and the azeotrope solvent). The mixture solution thus obtained was stirred at room temperature (23° C.) for 1 hour. Thereafter, while stirred, the solution was allowed to react in a nitrogen atmosphere for 5 hours at 180° C. to thereby obtain a polyimide solution. The polyimide solution thus obtained was allowed to drip onto 1 L of IPA for deposition. As a result, a powdery polyimide was obtained. The powdery polyimide thus obtained was washed five times with IPA and then dried in vacuum by a vacuum drying device for 12 hours at 120° C. In this way, a polyimide was obtained. The result of evaluation of the polyimide thus obtained is shown in Table 2.

Comparative Example 4

A polyimide solution containing the polyimide synthesized in Synthesis Example 13 in a concentration of 15% by weight was prepared with use of NMP as a solvent. A coating of the polyimide solution thus prepared was applied onto a glass plate by a bar coater. Subsequently, the coating of the polyimide solution was dried in air for 30 minutes at 100° C. and then dried in a nitrogen atmosphere for 1 hour at 350° C. As a result, a polyimide film of 10 μm in film thickness was obtained. The result of evaluation of the polyimide film is shown in Table 3.

Synthesis Example 14

<Polymerization of Polyamic Acid>

Into a 500 mL glass separable flask equipped with (i) a stirrer having a stainless stirring rod and (ii) a nitrogen inlet tube, 13.3 g of 4,4'-ODA was introduced. To the 4,4'-ODA, 170.0 g of DMAc that had been dehydrated was added as a solvent for polymerization, and the mixture solution thus obtained was stirred. Subsequently, to the solution, 16.7 g of bicyclo[2.2.2]octane-2,3,5,6-tetracarboxylic dianhydride (hereinafter also referred to as BTA-H) was added, and the mixture solution thus obtained was stirred for 12 hours at room temperature (23° C.). Note that this reaction solution contained 30% diamine compound and tetracarboxylic dianhydride by weight with respect to the whole reaction solution.

Comparative Example 5

The polyamic acid solution thus polymerized in Synthesis Example 14 was diluted with DMAc to adjust a polyamic acid concentration to 25% by weight. Thereafter, a coating of the polyamic acid solution thus adjusted was applied onto a glass plate by a bar coater. Subsequently, the coating of the polyamic acid solution was dried in air for minutes at 100° C. and then dried in a nitrogen atmosphere for 1 hour at 350° C. As a result, a polyimide film of 10 μm in film thickness was obtained. The result of evaluation of the polyimide film is shown in Table 3.

INDUSTRIAL APPLICABILITY

The polyimide and polyamic acid of the present invention each have optical isotropy as well as heat resistance and transparency. Accordingly, the polyimide and polyamic acid of the present invention are each suitable for a film or a coating film of all publicly-known members which require heat resistance. Moreover, the polyimide and polyamic acid of the present invention are each soluble in various organic solvents, and therefore can be easily applied, in polyimide solution form and polyamic acid solution form, respectively, to various substrates. The polyimide of the present invention is expected to be used, for example, as a material for TFT substrate, a material for ITO substrate, a printed material, a color filter, a flexible display member, an antireflection film, a hologram, an optical member, a building material, or a construction.

The invention claimed is:

1. A polyimide consisting of a structure represented by the following General Formula (5):

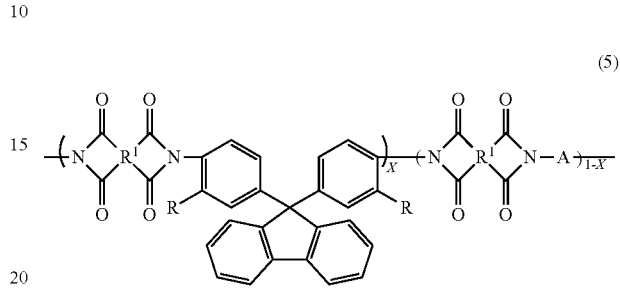

(5)

where each $R^1$ represents independently a tetravalent organic group having an alicyclic hydrocarbon structure, each R is independently selected from the group consisting of a hydrogen atom, a fluorine atom, and a methyl group, A is a divalent organic group having no fluorene skeleton, and X and 1−X represent respective molar fractions of structural units constituting the polyimide and each satisfy $0.5 \leq X \leq 0.7$; wherein the divalent organic group, which is represented by A in the General Formula (5), is a divalent organic group having an ether bond; and wherein a polyimide film obtained from the polyimide satisfies $nx-ny<0.0002$ and $(nx+ny)/2-nz<0.005$, where nx and ny represent highest and lowest refractive indices in an in-plane direction of the polyimide film, respectively, and nz represents a refractive index in a thickness direction of the polyimide film.

2. The polyimide according to claim 1, wherein the divalent organic group represented by A in the General Formula (5) is derived from at least one diamine selected from the group consisting of 4,4'-diaminodiphenyl ether; 3,4'-diaminodiphenyl ether; 2,2-bis(4-aminophenoxyphenyl)propane; 1,4-bis(4-aminophenoxy)benzene; 1,3-bis(4-aminophenoxy)benzene; 1,3-bis(3-aminophenoxy)benzene; and 4,4'-bis(4-aminophenoxy)biphenyl.

3. A polyimide solution comprising:
(i) a polyimide according to claim 1; and
(ii) an organic solvent.

4. The polyimide solution according to claim 3, wherein the organic solvent includes at least one selected from amide solvents, ketone solvents, ester solvents, and ether solvents.

5. A polyamic acid consisting of a structure represented by the following General Formula (6):

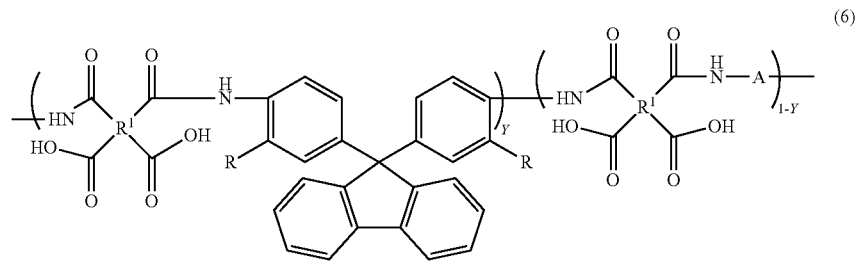

(6)

where each R¹ represents independently a tetravalent organic group having an alicyclic hydrocarbon structure, each R is independently selected from the group consisting of a hydrogen atom, a fluorine atom, and a methyl group, A is a divalent organic group having no fluorene skeleton, and Y and 1−Y represent respective molar fractions of structural units constituting a polyamic acid and each satisfy 0.5≤Y≤0.7; wherein the divalent organic group, which is represented by A in the General Formula (6), is a divalent organic group having an ether bond; and wherein a polyimide film obtained from the polyamic acid satisfies nx−ny<0.0002 and (nx+ny)/2−nz<0.005, where nx and ny represent highest and lowest refractive indices in an in-plane direction of the polyimide film, respectively, and nz represents a refractive index in a thickness direction of the polyimide film.

6. The polyamic acid according to claim 5, wherein the divalent organic group represented by A in the General Formula (6) is derived from at least one diamine selected from the group consisting of 4,4'-diaminodiphenyl ether, 3,4'-diaminodiphenyl ether, 2,2-bis(4-aminophenoxyphenyl)propane, 1,4-bis(4-aminophenoxy)benzene, 1,3-bis(4-aminophenoxy)benzene, 1,3-bis(3-aminophenoxy)benzene, and 4,4'-bis(4-aminophenoxy)biphenyl.

7. The polyamic acid according to claim 5, wherein the polyamic acid having the structure represented by the General Formula (6) is partially imidized.

8. A polyamic acid solution comprising:

(i) a polyamic acid according to claim 5, and (ii) an organic solvent.

9. The polyamic acid solution according to claim 8, wherein the organic solvent includes at least one selected from amide solvents, ketone solvents, ester solvents, and ether solvents.

10. A polyimide film, wherein the polyimide consists of a structure represented by the following General Formula (5):

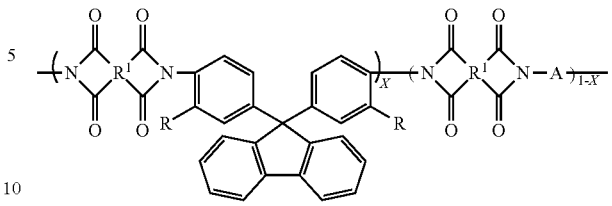

(5)

where each R¹ represents independently a tetravalent organic group having an alicyclic hydrocarbon structure, each R is independently selected from the group consisting of a hydrogen atom, a fluorine atom, and a methyl group, A is a divalent organic group having no fluorene skeleton, and X and 1−X represent respective molar fractions of structural units constituting the polyimide and each satisfy 0.5≤X≤0.7; wherein the divalent organic group, which is represented by A in the General Formula (5), is a divalent organic group having an ether bond; and wherein the polyimide film satisfies nx−ny<0.0002 and (nx+ny)/2−nz<0.005, where nx and ny represent highest and lowest refractive indices in an in-plane direction of the polyimide film, respectively, and nz represents a refractive index in a thickness direction of the polyimide film.

11. The polyimide film according to claim 10, wherein when the polyimide film is 10 μm in film thickness, the polyimide film has light transmittance of 70% or more at a wavelength of 400 nm.

12. The polyimide film according to claim 10, wherein the polyimide film has a glass transition temperature of 250° C. or higher.

13. A substrate comprising a polyimide film according to claim 10.

14. An optical material comprising a polyimide film according to claim 10.

15. An image display device comprising a polyimide film according to claim 10.

16. An electronic device material comprising a polyimide film according to claim 10.

* * * * *